United States Patent
Roussel

(10) Patent No.: US 8,200,941 B2
(45) Date of Patent: Jun. 12, 2012

(54) LOAD/MOVE DUPLICATE INSTRUCTIONS FOR A PROCESSOR

(75) Inventor: Patrice Roussel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/088,198

(22) Filed: Apr. 15, 2011

(65) Prior Publication Data

US 2011/0258418 A1     Oct. 20, 2011

Related U.S. Application Data

(63) Continuation of application No. 12/940,782, filed on Nov. 5, 2010, now Pat. No. 8,032,735, which is a continuation of application No. 10/032,144, filed on Dec. 20, 2001, now Pat. No. 7,853,778.

(51) Int. Cl.
*G06F 9/00*     (2006.01)

(52) U.S. Cl. ......................................... 712/22; 712/225

(58) Field of Classification Search .................... 712/22, 712/225

See application file for complete search history.

(56) References Cited

U.S. PATENT DOCUMENTS

| | | |
|---|---|---|
| 4,141,005 A | 2/1979 | Bonner et al. |
| 5,268,995 A | 12/1993 | Diefendorff et al. |
| 5,613,121 A | 3/1997 | Blainey |
| 5,875,355 A | 2/1999 | Sidwell et al. |
| 5,936,872 A | 8/1999 | Fischer et al. |
| 5,983,253 A | 11/1999 | Fischer et al. |
| 5,995,748 A | 11/1999 | Guttag et al. |
| 6,041,404 A | 3/2000 | Roussel et al. |
| 6,115,812 A | 9/2000 | Abdallah et al. |
| 6,560,667 B1 | 5/2003 | Wolrich et al. |
| 6,820,190 B1 | 11/2004 | Knebel et al. |
| 7,085,795 B2 | 8/2006 | Debes et al. |
| 7,155,601 B2 | 12/2006 | Chennupaty et al. |
| 7,631,025 B2 | 12/2009 | Debes et al. |

FOREIGN PATENT DOCUMENTS

EP     0743594     11/1996

OTHER PUBLICATIONS

Lee, Ruby; "Subword Parallelism with MAX-2"; 1996; IEEE.*
PCT Search Report (PCT/US 02/40166), mailed Apr. 28, 2003, 3 pgs.
"SSE Shuffle Instructions", http://www.tommesani.com/SSEShuffle.html, 2000, downloaded Mar. 2, 2010, 1 pg.
INTEL, "Using Streaming SIMD Extensions 3 in Algorithms with Complex Arithmetic", Version 1.0, Jan. 2004, pp. 1-24.
INTEL, "Intel Architecture Software Developer's Manual vol. 2: Instruction Set Reference", 1999, pp. 3-646-3-650.
Mitsuru Ikei, "Basic Course for IA-64 Processor". Japan, Ohmsha, Aug. 25, 2000, (in Japanese along with translation) 10 pgs.

* cited by examiner

*Primary Examiner* — Chun-Kuan Lee
*Assistant Examiner* — Benjamin Geib
(74) *Attorney, Agent, or Firm* — Blakely, Sokoloff, Taylor & Zafman LLP

(57) ABSTRACT

A method includes, in a processor, loading/moving a first portion of bits of a source into a first portion of a destination register and duplicate that first portion of bits in a subsequent portion of the destination register.

21 Claims, 5 Drawing Sheets

| SIMD Extension | Register Layout | Data Type |
|---|---|---|
| MMX Technology | MMX Registers — 58 | 8 Packed Byte Integers |
| | | 4 Packed Word Integers |
| | | 2 Packed Doubleword Integers |
| | | Quadword |
| SSE | MMX Registers — 58 | 8 Packed Byte Integers |
| | | 4 Packed Word Integers |
| | | 2 Packed Doubleword Integers |
| | | Quadword |
| | XMM Registers — 84 | 4 Packed Single-Precision Floating-Point Values |
| SSE2 | MMX Registers — 58 | 2 Packed Doubleword Integers |
| | | Quadword |
| | XMM Registers — 84 | 2 Packed Double-Precision Floating-Point Values |
| | | 16 Packed Byte Integers |
| | | 8 Packed Word Integers |
| | | 4 Packed Doubleword Integers |
| | | 2 Quadword Integers |
| | | Double Quadword |

FIG. 5

LOAD/MOVE DUPLICATE INSTRUCTIONS FOR A PROCESSOR

The present application is a continuation of U.S. patent application Ser. No. 12/940,782, filed on Nov. 5, 2010 now U.S Pat. No. 8,032,735, entitled "Load/Move Duplicate Instructions for a Processor", which itself is a continuation of U.S. patent application Ser. No. 10/032,144, filed on Dec. 20, 2001, entitled "Load/Move Duplicate Instructions for a Processor", now U.S. Pat. No. 7,853,778. U.S. patent application Ser. No. 10/032,144 is hereby incorporated herein by reference and U.S. patent application Ser. No. 12/940,782 is hereby incorporated herein by reference.

TECHNICAL FIELD

This invention relates to load/move and duplicate instructions for a processor.

BACKGROUND

A system architecture describes the mode of operation of a processor and mechanisms provided to support operating systems and including system-oriented registers and data structures and system-oriented instructions. The system architecture also provides the mechanisms necessary for switching between real-address and protected modes.

Introduction of a single-instruction, multiple-data (SIMD) technology to a system architecture provides for parallel computations on packed integer data contained in 64-bit registers. SIMD provides enhanced performance to a processor in, for example, advanced media, image processing and data compression applications.

DESCRIPTION OF DRAWINGS

FIG. 5 shows a table summarizing the various SIMD extensions, data types and how the data types are packed into registers.

DETAILED DESCRIPTION

Figure 1:
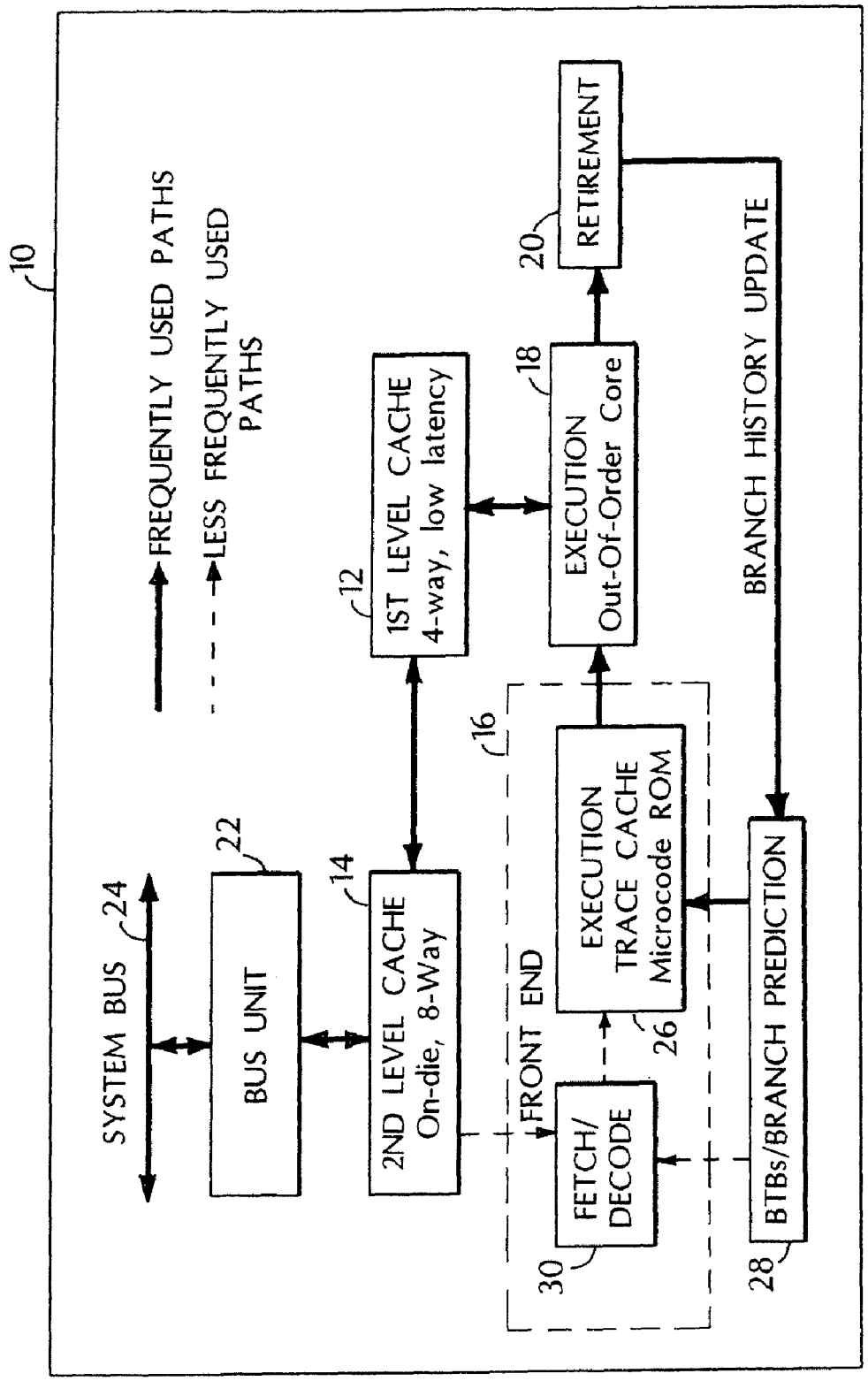
FIG. 1 is a block diagram of a processor.

Referring to FIG. 1 a processor 10 is shown. The processor 10 is a three way super scaler, pipelined architecture. Using parallel processing techniques, the processor 10 is able on average to decode, dispatch, and complete execution of (retire) three instructions per clock cycle. To handle this level of instruction throughput, the processor 10 uses a decoupled, twelve stage pipeline that supports out of order instruction execution. The micro architecture pipeline of the processor 10 is divided into four sections, i.e., a first level cache 12 and a second level cache 14, a front end 16, an out of order execution core 18, and a retire section 20. Instructions and data are supplied to these units through a bus interface unit 22 that interfaces with a system bus 24. The front end 16 supplies instructions in program order to the out of order core 18 that has very high execution bandwidth and can execute basic integer operations with one-half clock cycle latency. The front end 16 fetches and decodes instructions into simple operations called micro-ops (µ-ops). The front end 16 can issue multiple µ-ops per cycle, in original program order, to the out of order core 18. The front end 16 performs several basic functions. For example, the front end 16 performs prefetch instructions that are likely to be executed, fetch instructions that have not already been prefetched, decode instructions into micro operations, generates micro code for complex instructions and special purpose code, delivers decoded instructions from an execution trace cache 26, and predicts branches using advanced algorithms in a branch prediction unit 28.

The front end 16 of the processor 10 is designed to address some common problems in high speed, pipelined microprocessors. Two of these problems, for example, contribute to major sources of delays. These are the time to decode instructions fetched from the target and wasted decode bandwidth due to branches or branch target in the middle of cache lines.

The execution trace cache 26 addresses both of these issues by storing decoded instructions. Instructions are fetched and decoded by a translation engine (not shown) and built into sequences of µ-ops called traces. These traces of µ-ops are stored in the trace cache 26. The instructions from the most likely target of a branch immediately follow the branch without regard for continuity of instruction addresses. Once a trace is built, the trace cache 26 is searched for the instruction that follows that trace. If that instruction appears as the first instruction in an existing trace, the fetch and decode of instructions 30 from the memory hierarchy ceases and the trace cache 26 becomes the new source of instructions.

The execution trace cache 18 and the translation engine (not shown) have cooperating branch prediction hardware. Branch targets are predicted based or their linear addresses using Branch Target Buffers (BTBS) 28 and fetched as soon as possible. The branch targets are fetched from the trace cache 26 if they are indeed cached there; otherwise, they are fetched from the memory hierarchy. The translation engine's branch prediction information is used to form traces along the most likely paths.

The core 18 executes instructions out of order enabling the processor 10 to reorder instructions so that if one µ-op is delayed while waiting for data or a contended execution resource, other µ-ops that are later in program order may proceed around it. The processor 10 employs several buffers to smooth the flow of µ-ops. This implies that when one portion of the pipeline experiences a delay, that delay may be covered by other operations executing in parallel or by the execution of µ-ops which were previously queued up in a buffer.

The core 18 is designed to facilitate parallel execution. The core 18 can dispatch up to six µ-ops per cycle; note that this exceeds the trace cache 26 and retirement 20 µ-op bandwidth. most pipelines can start executing a new µ-op every cycle, so that several instructions can be processed any time for each pipeline. A number of arithmetic logical unit (ALU) instructions can start two per cycle, and many floating point instructions can start one every two cycles. Finally, µ-ops can begin execution, out of order, as soon as their data inputs are ready and resources are available.

The retirement section 20 receives the results of the executed µ-ops from the execution core 18 and processes the results so that the proper architectural state is updated according to the original program order. For semantically correct execution, the results of instructions are committed in original program order before it is retired. Exceptions may be raised as instructions are retired. Thus, exceptions cannot occur speculatively. They occur in the correct order, and the processor 10 can be correctly restarted after execution.

When a µ-op completes and writes its result to the destination, it is retired. Up to three µ-ops may be retired per cycle.

A ReOrder Buffer (ROB) (not shown) in the retirement section 20 is the unit in the processor 10 which buffers completed μ-ops, updates the architectural state in order, and manages the ordering of exceptions.

The retirement section 20 also keeps track of branches and sends updated branch target information to the BTB 28 to update branch history. In this manner, traces that are no longer needed can be purged from the trace cache 26 and new branch paths can be fetched, based on updated branch history information.

Figure 2:
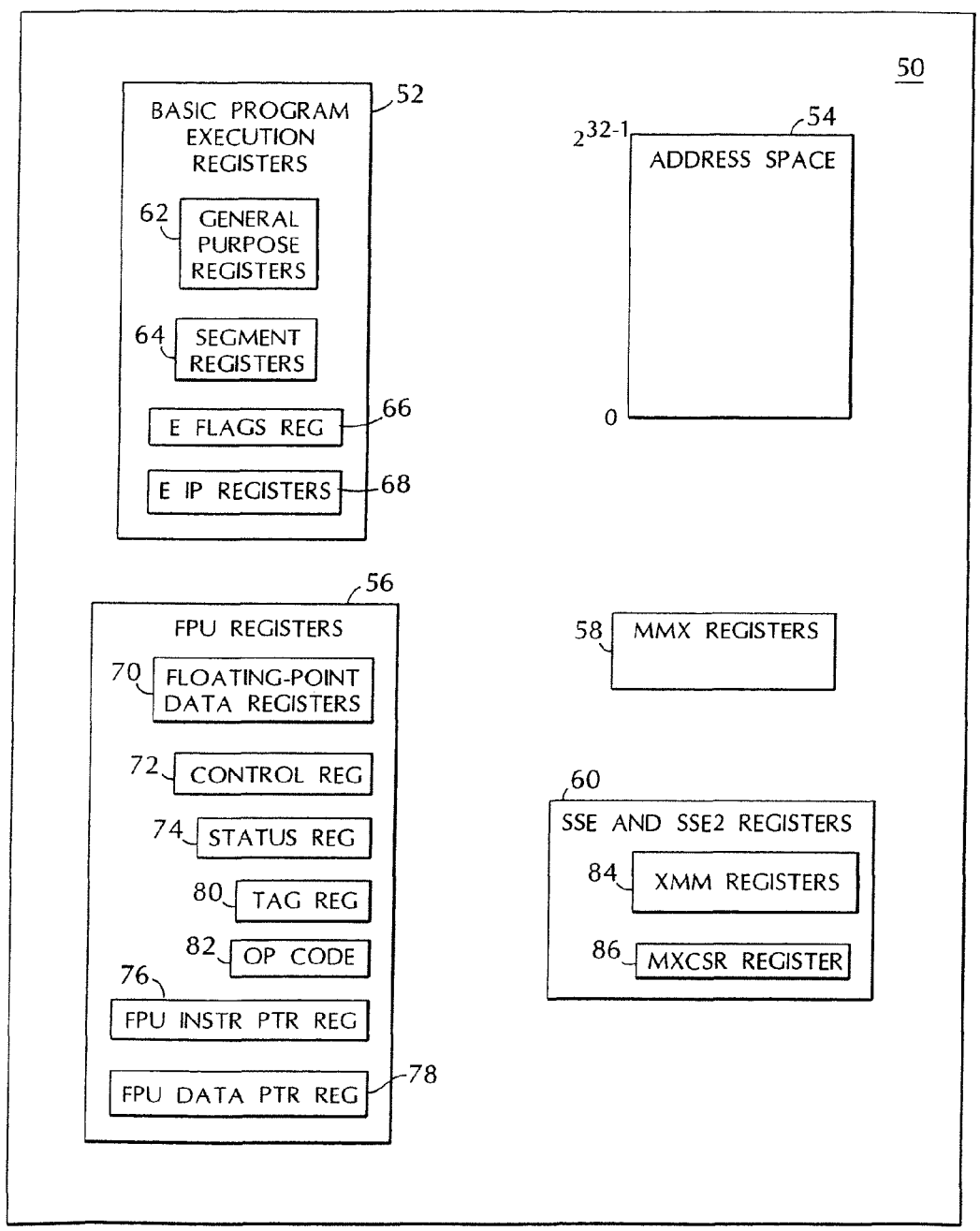
FIG. 2 is a block diagram of an executive environment.

Referring to FIG. 2, an execution environment 50 is shown. Any program or task running on the processor 10 (of FIG. 1) is given a set of resources for executing instructions and for storing code, data, and state information. These resources make up the execution environment 50 for the processor 10. Application programs and the operating system or executive running on the processor 10 use the execution environment 50 jointly. The execution environment 50 includes basic program execution registers 52, an address space 54, Floating Point Unit (FPU) registers 56, multimedia extension registers (MMX) 58, and SIMD extension (SSE and SSE2) registers 60.

Any task or program running on the processor 10 can address a linear address base 54 of up to four gigabytes ($2^{32}$ bytes) and a physical address space of up to 64 gigabytes ($2^{36}$ bytes). The address space 54 can be flat or segmented. Using a physical address extension mechanism, a physical address space of $2^{36-1}$ can be addressed.

The basic program execution registers 52 include eight general purpose registers 62, six segment registers 64, an EFLAGS register 66, and an EIP (instruction pointer) register 68. The basic program execution registers 52 provide a basic execution environment in which to execute a set of general purpose instructions. These instructions perform basic integer arithmetic on byte, word, and doubleword integers, handle program flow control, operate on bit and byte strengths, and address memory.

The FPU registers 56 include eight FPU data registers 70, an FPU control register 72, a status register 74, an FPU instruction pointer register 76, an FPU operand (data) pointer register 78, an FPU tag register 80 and an FPU op code register 82. The FPU registers 56 provide an execution environment for operating on single precision, double precision, and double extended precision floating point values, word-, doubleword, and quadword integers, and binary coded decimal (BCD) values.

The eight multimedia extension registers 58 support execution of single instruction, multiple data (SIMD) operations on 64-bit packed byte, word, and doubleword integers.

The SIMD extension (SSE and SSE2) registers 60 include eight extended multimedia (XMM) data registers 84 and an MXCSR register 86. The SIMD extension (SSE and SSE2) registers 60 support execution of SIMD operations on 128-bit packed single precision and double precision floating point values and on 128-bit packed byte, word, doubleword and quadword integers.

A stack (not shown) supports procedure or subroutine calls and the passing of parameters between procedures or subroutines.

The general purpose registers 62 are available for storing operands and pointers. The segment registers 64 hold up to six segment selectors. The EFLAGS (program status and control) registers 66 report on the status of a program being executed and allows limited (application program level) control of the processor. The EIP (instruction pointer) register 68 contains a 32-bit pointer to the next instruction to be executed.

The 32-bit general purpose registers 62 are provided for holding operands for logical and arithmetic operations, operands for address calculations, and memory pointers. The segment registers 64 hold 16-bit segment selectors. A segment selector in a special pointer that identifies a segment in memory. To access a particular segment in memory, the segment selector for that segment must he present in the appropriate segment register 64.

When writing application code, programmers generally produce segment selectors with assembler directives and symbols. The assembler and other tools then generate the actual segment selector values associated with these directives and symbols. If writing system code, programmers may need to generate segment selectors directly.

How segment registers 64 are used depends on the type of memory management model that the operating system or executive is using. When using a flat (unsegmented) memory model, the segment registers 64 are loaded with segment selectors that point to overlapping segments, each of which begins at address zero on the linear address space. These overlapping segments then include the linear address space for the program. Typically, two overlapping segments are defined: one for code and another for data and stacks. The CS segment register (not shown) of the segment registers 64 points to the code segment and all other segment registers point to the data and stack segment.

When using a segmented memory model, each segment register 64 is ordinarily loaded with a different segment selector so that each segment register 64 points to a different segment within the linear address space. At any time, a program can thus access up to six segments in the linear address space. To access a segment not pointed to by one of the segment registers 64, a program first loads the segment selector to be accessed into a segment register 64.

The 32-bit EFLAGS register 66 contains a group of status flags, a control flag, and a group of system flags. Some of the flags in the EFLAGS register 66 can be modified directly, using special purpose instructions. There are no instructions that allow the whole register 66 to be examined or modified directly. However, the following instructions can be used to move groups of flags to and from the procedure stacks or general purpose register: LAHF, SAHF, push-F, push-FD, pop-F, and pop-FD. After the contents of EFLAGS register 66 have been transferred to the procedure stack or a general purpose register, the flags can be examined and modified using the processor 10 bit manipulation instructions.

When suspending a task, the processor 10 automatically saves the state of the EFLAGS register 66 in the task state segment (TSS) (not shown) for the task being suspended. When binding itself to a new task, the processor 10 loads the EFLAGS register 66 with data from the new tasks program state register (PSS, not shown).

When a call is made to an interrupt or an exception handler procedure the processor 10 automatically saves the state of the EFLAGS register 66 on the procedure stack. When an interrupt or exception is handled with a task switch, the state of the EFLAGS register 66 is saved on the TSS for the task being suspended.

The fundamental data types used in the processor 10 are bytes, words, doublewords, quadwords and double quadwords. A byte is eight bits, a word is two bytes (16-bits), a doubleword is four bytes (32-bits), a quad word is eight bytes (64-bits), and a double quadword is sixteen bytes (128-bits).

Figure 3:
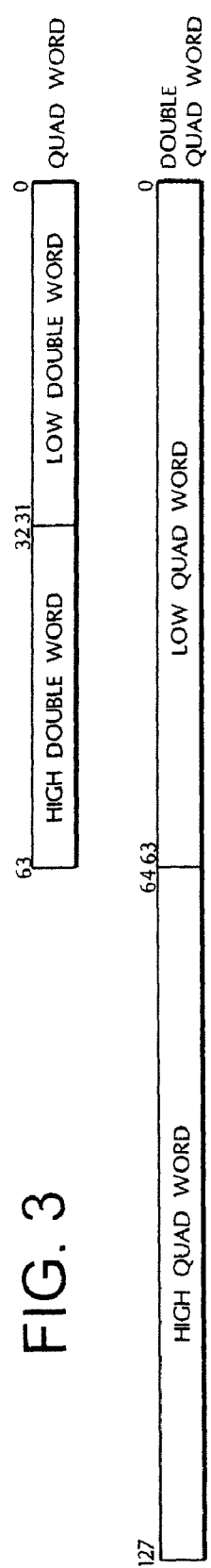
FIG. 3 is a diagram of a byte order fundamental data type.

Referring to FIG. 3, a byte order of each of the fundamental data types when referenced as operands in memory is shown.

The low byte (bits 0-7) of each data type occupies the lowest address in memory and that address is also the address of the operand.

Words, doublewords and quadwords do not need to be aligned in memory on natural boundaries. The natural boundaries for words, doublewords and quadwords are even numbered addresses, addresses evenly divisible by 4, and addresses evenly divisible by 8, respectively. However, to improve the performance of programs, data structures (especially stacks) should be aligned on natural boundaries whenever possible. The reason for this is that the processor 10 requires two memory accesses to make an unaligned memory access; whereas aligned accesses require one memory access. A word or double-word operand that crosses a 4 byte boundary or a quadword operand that crosses an 8 byte boundary is considered unaligned and requires two separate memory bus cycles to access it. A word that starts on an odd address but does not cross a word boundary is considered aligned and can still be accessed in one bus cycle.

Some instructions that operate on double quadwords require memory operands to be aligned on a natural boundary. These instructions generate a general protection exception (#GP) if an unaligned operand is specified. A natural boundary for a double quadword is any address evenly divisible by 16. Other instructions that operate on double quadwords permit unaligned access without generating a general protection exception, however, additional memory bus cycles are required to access unaligned data from memory.

Although bytes, words and doublewords are the fundamental data types of the processor 10, some instructions support additional interpretation of these data types to allow operations to be performed on numeric data types. For example, the processor 10 defines two types of integers: unsigned and signed. Unsigned integers are ordinary binary values ranging from zero to the maximum positive number that can be encoded in the selected operand size. Signed integers are two's complement binary values that can be used to represent both positive and negative integer values.

The processor 10 defines and operates on three floating point data types: signal precision floating point, double precision floating point, and double extended precision floating point. The data formats for these data types correspond directly Lo format as specified in the IEEE standard 754 for binary floating point arithmetic.

Pointers are addresses of locations in memory. The processor 10 defines two types of pointers: a near pointer (32-bits) and a far pointer (48-bits). A near pointer is a 32-bit offset (also called an effective address) within a segment. Near pointers are used for all memory references in a flat memory model or for references in a segmented model when the identity of the segment being accessed is implied. A far pointer is a 46-bit logical address, consisting of a 16-bit segment selector and a 32-bit offset. Far pointers are used for memory references and a segmented memory model where the identity of a segment being accessed must be specified explicitly.

A bit field is a continuous sequence of bits. It can begin at any bit position of any byte in memory and can contain up to 32-bits. Strings are continuous sequences of bits, bytes, words or doublewords. A bit string can begin at any bit position of any byte and can contain up to $2^{32-1}$ bits. A byte string can contain bytes, words or doublewords and can range from zero to $2^{32-1}$ bytes (four gigabytes).

Binary coded decimal integers (BCD integers) are unsigned four-bit integers with valid values ranging from 0 to 9. The processor 10 defines operations on BCD integers located in one or more general purpose registers 62 or in one or more FPU registers 56.

Figure 4:
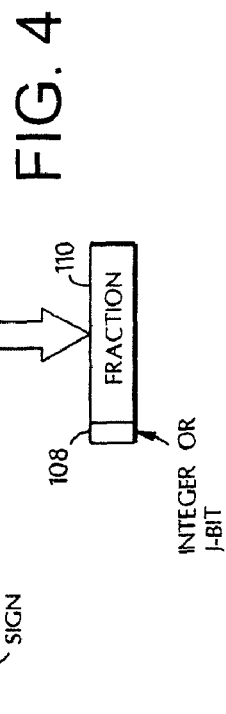
FIG. 4 shows a floating-point format.

Referring to FIG. 4, real numbers are represented in a floating point format 100 in the FPU 56 floating point registers 70. The floating point format includes three parts, i.e., a sign 102, a significand 104 and an exponent 106. The sign 102 is a binary value that indicates whether the number is positive (0) or negative (1). The significand 104 has two parts: a 1-bit binary integer (also referred to as a J-bit) 108 and a binary fraction 110. The integer-bit 108 is often not represented, but instead is an implied value. The exponent 106 is a binary integer that represents a base-2 power that the significand 104 is multiplied by.

The processor 10 defines and operates on a set of 64-bit and 128-bit packed data types for use in SIMD operations. These data types include fundamental data types (packed bytes, words, doublewords and quadwords) and numeric interpretations of fundamental data types for use in packed integer and packed floating point operations.

The 64-bit SIMD data types are operated on primarily in the 64-bit multimedia extension registers 58. The fundamental 64-bit packed data types are packed bytes, packed words and packed doublewords. When performing numeric SIMD operations on these data types in multimedia extension registers 58, these data types are interpreted as containing bytes, words, or doubleword integer values.

The 128-bit packed SIMD data types are operated on primarily in the 128-bit extended multimedia (XMM) registers 84 and memory 54. The fundamental 128-bit packed data types are packed bytes, packed words, packed doublewords and packed quadwords. When performing SIMD operations on these fundamental data types in extended multimedia (XMM) registers 84, these data types are interpreted as containing packed or scaler single precision floating point or double precision floating point values, or as containing packed byte, word, doubleword, quadword integer values.

Referring to FIG. 5, a table 120 shows a summary of the various SIMD extensions, the data types operated on, and how the data types are packed into multimedia extension registers 58 and extended multimedia (XMM) registers 84.

As described above, multimedia extension instructions operate on packed byte, word, doubleword or quadword integer operands contained in memory 54, in multimedia extension registers 58, and/or in the general purposes registers 62. The multimedia extension instructions include data transfer instructions, conversion instructions, packed arithmetic instructions, comparison instructions, logical instructions, shift and rotate instructions and state management instructions.

SIMD extension (SSE and SSE2) instructions are divided into a number, e.g., four groups: SIMD single-precision floating point instructions that operate on the extended multimedia (XMM) registers 84, MXSCR instructions that operate on the MXCSR register 86, 64-bit SIMD integer instructions that operate on the MXX registers 58, and cacheability control, prefetch and instruction ordering instructions.

One class of instructions is move/load and duplicate-type instructions. These instructions are referred to as "combined" instructions in that they save the need to do an explicit operation on the value loaded to get, for example, duplication of bits. The present architecture includes a MOVDDUP instruction, a MOVSHDUP instruction and a MOVSLDUP instruction. These instructions are provided to support complex arithmetic with packed single and packed double-precision floating point data types. These instructions can be used in various applications. For example, these instructions can improve the efficiency of signal processing applications and applications that involve processing natural data types.

Figure 6:
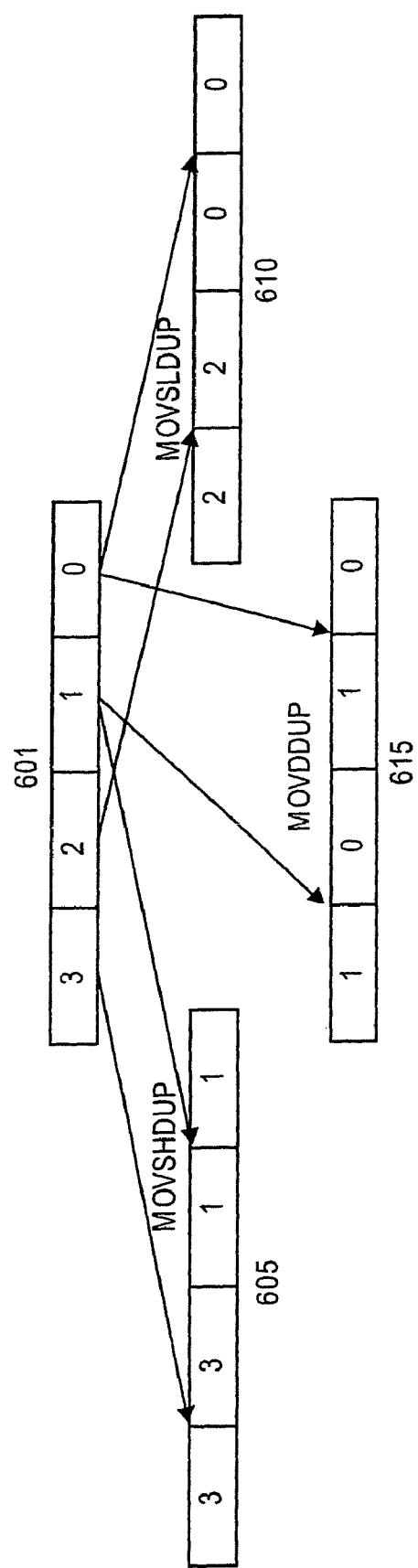
FIG. 6 illustrates operations that may be performed according to the one embodiment of the invention.

FIG. 6 illustrates operations that may be performed by executing the MOVDDUP, MOVSHDUP, or MOVSLDUP instructions, according to one embodiment.

The MOVDDUP instruction is move one double-floating point and duplicate SSE2 instruction that loads/moves 64-bits (bits [63-0] if the source is a register). Execution of the MOVDDUP instruction returns the same 64-bits in both the lower and upper halves of the same result register, that is, duplicating the 64-bits from the source. Thus, if the source has entries 1/0 the destination will have entries 1/0/1/0. The MOVEDDUP instruction has the following format:

MOVEDDUP destination, source where the source operand is a memory location 54 or a second extended multimedia (XMM) register 84 and the destination operand is a first extended multimedia (XMM) register 84. The source contains a double-floating point data type.

In operation, if the source operand is a memory address, bits [63-0] of the first extended multimedia (XMM) register are loaded with bits [63-0] of the memory address and bits [127-64] of the first extended multimedia (XMM) register are loaded with bits [63-0] of the memory location. If the source operand is a second extended multimedia (XMM) register, bits [63-0] of the first extended multimedia (XMM) register are set equal to bits [63-0] of the second extended multimedia (XMM) register and bits [127-64] of the first extended multimedia (XMM) register are set equal to bits [63-0] of the second extended multimedia (XMM) register.

The linear address corresponds to the address of the least-significant byte of the referenced memory data. When a memory address is indicated, the 16 bytes of data at the memory location are loaded or stored. When the register-register form of the operation is used, the content of the 128-bit source register is copied into the 128-bit destination register.

The MOVSHDUP instruction is a move packed single-floating point high and duplicate SSE2 instruction that loads/moves 128-bits and duplicates entries 1 and 3 in the resulting register. In the example of a 128-bit source register width, each entry is 32 bits. Specifically, with a source being 3/2/1/0 entries (0 being the low single-precision entry and 3 being the high single-precision entry), a result register after execution of the MOVSHDUP instruction will store entries 3 and 1 duplicated to provide entries 3/3/1/1. The MOVSHOUP has the following format:

MOVSHDUP destination, source where the source operand represents a memory location 54 or a second extended multimedia (XMM) register 84 and the destination operand is a first extended multimedia (XMM) register 84. The source operand has a packed single-floating point data type.

In operation, if the source operand is a memory address, bits [31-0] of the first extended multimedia (XMM) register are loaded with bits [63-32] of the memory address, bits 63-32 of the first extended multimedia (XMM) register are loaded with bits [63-32] of the memory address, bits 95-64 of the first extended multimedia (XMM) register are loaded with bits [127-96] of the memory address and bits 127-96 of the first extended multimedia (XMM) register are loaded with bits [127-96] of the memory address.

If the source operand is a second extended multimedia (XMM) register, bits [31-0] of the first extended multimedia (XMM) register are set equal to bits [63-32] of the second extended multimedia (XMM) register, bits [63-32] of the first extended multimedia (XMM) register are set equal to bits [83-32] of the second extended multimedia (XMM) register, bits [95-64] of the first extended multimedia (XMM) register are set equal to bits [127-96] of the second extended multimedia (XMM) register, and bits [127-96] of the first extended multimedia (XMM) register are set equal to bits [127-96] of the second extended multimedia (XMM) register.

The linear address corresponds to the address of the least-significant byte of the referenced memory data. When a memory address is indicated, the 16 bytes of data at the memory location are loaded or stored. When the register-register form of the operation is used, the content of the 128-bit source register is copied into the 128-bit destination register.

The MOVSLDUP instruction is a move packed single-floating point low and duplicate SSE2 instruction that loads/moves 128-bits and duplicates entries 0 and 2. Specifically, with a source being 3/2/1/0 (0 being the lower single-precision entry), a result register will store entries 2/2/0/0. The MOVSLDUP instruction has the following format:

MOVSLDUP destination, source where the source operand is a memory location 54 or a second extended multimedia (XMM) register 84 and the destination operand is a first extended multimedia (XMM) register 84. The source operand contains a packed single-floating point data type.

In operation, if the source operand is memory address, bits [31-0] of the first extended multimedia (XMM) register are loaded with bits [31-0] of the memory address, bits [63-32] of the first extended multimedia (XMM) register are loaded with bits [31-0] of the memory address, bits [95-64] of the first extended multimedia (XMM) register are loaded with bits [95-64] the memory address and bits [127-96] of the first extended multimedia (XMM) register are loaded with bits [95-64] of the memory address. If the source operand is a register, bits [31-0] of the first extended multimedia (XMM) register are set equal to bits [31-0] of the second extended multimedia (XMM) register, bits [63-32] of the first extended multimedia (XMM) register are set equal to bits [31-0] of the second extended multimedia (XMM) register, bits [95-64] of the first extended multimedia (XMM) register are set equal to bits [95-64] of the second extended multimedia (XMM) register and bits [127-96] of the first extended multimedia (XMM) register are set equal to bits [95-64] of the second extended multimedia (XMM) register.

The linear address corresponds to the address of the least-significant byte of the referenced memory data. When a memory address is indicated, the 16 bytes of data at the memory location are loaded or stored. When the register-register form of the operation is used, the content of the 128-bit source register is copied into the 128-bit destination register.

Accordingly, other embodiments are within the scope of the following claims.

What is claimed is:

1. An apparatus comprising:
   a front end to receive an instruction indicating a source and a destination, the source having a first plurality of packed floating point values, the first plurality of the packed floating point values including a first floating point value, a second floating point value, and a third floating point value, the second floating point value between the first floating point value and the third floating point value; and
   an execution core coupled with the front end, the execution core to store a result corresponding to the instruction in the destination, the result including a second plurality of packed floating point values, the second plurality of the packed floating point values including a fourth floating point value that is equal to the first floating point value, a fifth floating point value that is equal to the first floating point value, a sixth floating point value that is equal to the third floating point value, and a seventh floating point value that is equal to the third floating point value, wherein the instruction implicitly indicates that the fourth and fifth floating point values are to be equal to the first floating point value.

2. The apparatus of claim 1, wherein the instruction does not explicitly specify that the fourth and fifth floating point values are to be equal to the first floating point value.

3. The apparatus of claim 1, wherein an opcode of the instruction indicates that the fourth and fifth floating point values are to be equal to the first floating point value.

4. The apparatus of claim 1, wherein the fourth and fifth floating point values being equal to the first floating point value is fixed by a type of the instruction.

5. The apparatus of claim 1, wherein the instruction indicates a single source operand.

6. The apparatus of claim 1, wherein the source comprises one of a 128-bit memory location and a 128-bit register.

7. The apparatus of claim 1, wherein the core is to duplicate the first packed floating point data value of the source as a result of the instruction.

8. The apparatus of claim 1, wherein the fourth, fifth, sixth, and seventh floating point values are in entries 0, 1, 2, and 3 of the destination, wherein entry 0 is the lowest entry and 3 is the highest entry.

9. The apparatus of claim 1, wherein the source comprises a memory location, and wherein the first floating point value comprises a single precision floating point value.

10. An apparatus comprising:
a front end to receive an instruction indicating a single source and a destination, the source including a first plurality of packed single precision floating point values, the first plurality of the packed single precision floating point values including a first single precision floating point value in bits [31-0] of the source, a second single precision floating point value in bits [63-32] of the source, a third single precision floating point value in bits [95-64] of the source, and a fourth single precision floating point value in bits [127-96] of the source; and
an execution core coupled with the front end, the execution core to store a packed result corresponding to the instruction in the destination indicated by the instruction, the packed result including a second plurality of packed single precision floating point values, the second plurality of the packed single precision floating point values including a fifth single precision floating point value in bits [31-0] of the packed result that is equal to the first single precision floating point value, a sixth single precision floating point value in bits [63-32] of the packed result that is equal to the first single precision floating point value, a seventh single precision floating point value in bits [95-64] of the packed result that is equal to the third single precision floating point value, and an eighth single precision floating point value in bits [127-96] of the packed result that is equal to the third single precision floating point value,
wherein an op code of the instruction indicates that the fifth and the sixth single precision floating point values are to be equal to the first single precision floating point value.

11. The apparatus of claim 10, wherein the source comprises a memory location.

12. An apparatus comprising:
a front end to receive an instruction indicating a single source and a destination, the source including a first plurality of packed single precision floating point values, the first plurality of the packed single precision floating point values including a first single precision floating point value in bits [31-0] of the source, a second single precision floating point value in bits [63-32] of the source, a third single precision floating point value in bits [95-64] of the source, and a fourth single precision floating point value in bits [127-96] of the source; and
an execution core coupled with the front end, the execution core to store a packed result corresponding to the instruction in the destination indicated by the instruction, the packed result including a second plurality of packed single precision floating point values, the second plurality of the packed single precision floating point values including a fifth single precision floating point value in bits [31-0] of the packed result that is equal to the first single precision floating point value, a sixth single precision floating point value in bits [63-32] of the packed result that is equal to the first single precision floating point value, a seventh single precision floating point value in bits [95-64] of the packed result that is equal to the third single precision floating point value, and an eighth single precision floating point value in bits [127-96] of the packed result that is equal to the third single precision floating point value,
wherein the instruction implicitly indicates that the fifth and the sixth single precision floating point values are to be equal to the first single precision floating point value.

13. The apparatus of claim 12, wherein the source comprises a memory location.

14. An apparatus comprising:
a front end to receive an instruction indicating a single source and a destination, the source including a first plurality of packed single precision floating point values, the first plurality of the packed single precision floating point values including a first single precision floating point value in bits [31-0] of the source, a second single precision floating point value in bits [63-32] of the source, a third single precision floating point value in bits [95-64] of the source, and a fourth single precision floating point value in bits [127-96] of the source; and
an execution core coupled with the front end, the execution core to store a packed result corresponding to the instruction in the destination indicated by the instruction, the packed result including a second plurality of packed single precision floating point values, the second plurality of the packed single precision floating point values including a fifth single precision floating point value in bits [31-0] of the packed result that is equal to the second single precision floating point value, a sixth single precision floating point value in bits [63-32] of the packed result that is equal to the second single precision floating point value, a seventh single precision floating point value in bits [95-64] of the packed result that is equal to the fourth single precision floating point value, and an eighth single precision floating point value in bits [127-96] of the packed result that is equal to the fourth single precision floating point value,
wherein an op code of the instruction indicates that the fifth and the sixth single precision floating point values are to be equal to the second single precision floating point value.

15. The apparatus of claim 14, wherein the source corresponds to a memory location.

16. An apparatus comprising:
a front end to receive an instruction indicating a single source and a destination, the source including a first plurality of packed single precision floating point values, the first plurality of the packed single precision floating point values including a first single precision floating point value in bits [31-0] of the source, a second single precision floating point value in bits [63-32] of the source, a third single precision floating point value in bits [95-64] of the source, and a fourth single precision floating point value in bits [127-96] of the source; and
an execution core coupled with the front end, the execution core to store a packed result corresponding to the instruction in the destination indicated by the instruction, the packed result including a second plurality of packed single precision floating point values, the second plurality of the packed single precision floating point values including a fifth single precision floating point value in bits [31-0] of the packed result that is equal to the second single precision floating point value, a sixth single precision floating point value in bits [63-32] of the packed result that is equal to the second single precision floating point value, a seventh single precision floating point value in bits [95-64] of the packed result that is equal to the fourth single precision floating point value, and an eighth single precision floating point value in bits [127-96] of the packed result that is equal to the fourth single precision floating point value,
wherein the instruction implicitly indicates that the fifth and the sixth single precision floating point values are to be equal to the second single precision floating point value.

17. The apparatus of claim 16, wherein the source corresponds to a memory location.

18. An apparatus comprising:
a front end to receive instructions including a first instruction and a second instruction, the first instruction indicating a single first source and a first destination, the second instruction indicating a single second source and a second destination, the first instruction a different type of instruction than the second instruction; and
an execution core coupled with the front end, the execution core to store a first packed result corresponding to the first instruction and to store a second packed result corresponding to the second instruction, the first packed result including bits [31-0] of the first source stored in bits [63-32] and [31-0] of the first destination, and bits [95-64] of the first source stored in bits [127-96] and [95-64] of the first destination, the second packed result including bits [63-32] of the second source stored in bits [31-0] and [63-32] of the second destination and bits [127-96] of the second source stored in bits [95-64] and [127-96] of the second destination.

19. The apparatus of claim 18, wherein an op code of the first instruction is different than an op code of the second instruction.

20. The apparatus of claim 18, wherein an operation code of the first instruction indicates that bits [31-0] of the first source are to be stored in bits [63-32] and [31-0] of the first destination, and wherein an operation code of the second instruction indicates that bits [63-32] of the second source are to be stored in bits [31-0] and [63-32] of the second destination.

21. The apparatus of claim 18, wherein the first instruction implicitly indicates that bits [31-0] of the first source are to be stored in bits [63-32] and [31-0] of the first destination, and wherein the second instruction implicitly indicates that bits [63-32] of the second source are to be stored in bits [31-0] and [63-32] of the second destination.

* * * * *

UNITED STATES PATENT AND TRADEMARK OFFICE
CERTIFICATE OF CORRECTION

PATENT NO. : 8,200,941 B2
APPLICATION NO. : 13/088198
DATED : June 12, 2012
INVENTOR(S) : Roussel It is certified that error appears in the above-identified patent and that said Letters Patent is hereby corrected as shown below:

In the Specification

In column 2, at line 30 delete, "based or their" and insert -- based on their --.

In column 2, at line 50 delete, "most" and insert -- Most --.

In column 4, at line 5 delete, "selector in a" and insert -- selector is a --.

In column 4, at line 7 delete, "must he present" and insert -- must be present --.

In column 5, at line 52 delete, "46-bit" and insert -- 48-bit --.

In column 7, at line 46 delete, "MOVSHOUP" and insert -- MOVSHDUP --.

In column 8, at line 34 delete, "[95-64] the" and insert -- [95-64] of the --.

Signed and Sealed this
Fifteenth Day of April, 2014

Michelle K. Lee
*Deputy Director of the United States Patent and Trademark Office*